United States Patent
Kim et al.

(10) Patent No.: US 9,699,434 B2
(45) Date of Patent: *Jul. 4, 2017

(54) APPARATUS AND METHOD FOR ADJUSTING DEPTH

(71) Applicant: Samsung Electronics Co., Ltd., Suwon-si, Gyeonggi-do (KR)

(72) Inventors: Yun-Tae Kim, Hwaseong-si (KR); Gee-Young Sung, Daegu-si (KR); Dong Kyung Nam, Yongin-si (KR); Ju Yong Park, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 102 days.

This patent is subject to a terminal disclaimer.

(21) Appl. No.: 14/568,484

(22) Filed: Dec. 12, 2014

(65) Prior Publication Data

US 2016/0173851 A1   Jun. 16, 2016

Related U.S. Application Data

(63) Continuation of application No. 12/923,653, filed on Sep. 30, 2010, now Pat. No. 8,923,604.

(30) Foreign Application Priority Data

Oct. 7, 2009   (KR) .......................... 10-2009-0094936

(51) Int. Cl.
G06K 9/46   (2006.01)
H04N 13/00   (2006.01)
G06K 9/62   (2006.01)

(52) U.S. Cl.
CPC .......... *H04N 13/0022* (2013.01); *G06K 9/46* (2013.01); *G06K 9/6201* (2013.01)

(58) Field of Classification Search
None
See application file for complete search history.

(56) References Cited

U.S. PATENT DOCUMENTS 6,504,569 B1 *   1/2003   Jasinschi ............... G06T 7/0071
                                                           345/950
6,556,704 B1   4/2003   Chen
(Continued)

FOREIGN PATENT DOCUMENTS

KR   1020030017972 A   3/2003
KR   1020080000149 A   1/2008
(Continued)

OTHER PUBLICATIONS

Depth Map Quality Metric for Three-Dimensional Video. Kim, Min, Oh, and Sohn. Feb. 2009.*
(Continued)

*Primary Examiner* — Delomia L Gilliard
(74) *Attorney, Agent, or Firm* — Harness, Dickey & Pierce, P.L.C.

(57) ABSTRACT

A depth adjusting method and apparatus is described. The depth adjusting method and apparatus may calculate an average depth value of objects based on a spatial feature of an image, may adjust a depth of the image based on the calculated average value, and may adjust a depth of the image according to a difference in depth between a current frame and a previous frame, based on a temporal feature of the image.

16 Claims, 15 Drawing Sheets

(56) References Cited

U.S. PATENT DOCUMENTS

| | | | |
|---|---|---|---|
| 8,340,422 B2 | 12/2012 | Boughorbel | |
| 2004/0136571 A1 | 7/2004 | Hewitson et al. | |
| 2005/0089212 A1* | 4/2005 | Mashitani | H04N 13/0296 382/154 |
| 2006/0204075 A1 | 9/2006 | Mashitani et al. | |
| 2007/0052794 A1* | 3/2007 | Ha | H04N 13/0022 348/42 |
| 2008/0150945 A1* | 6/2008 | Wang | G06K 9/20 345/427 |
| 2009/0022393 A1* | 1/2009 | Bar-Zohar | G06T 7/0075 382/154 |
| 2010/0014781 A1 | 1/2010 | Liu et al. | |
| 2010/0046837 A1* | 2/2010 | Boughorbel | G06T 7/0051 382/173 |
| 2011/0081042 A1* | 4/2011 | Kim | H04N 13/0022 382/100 |
| 2011/0249099 A1* | 10/2011 | Vandewalle | G06T 7/0065 348/47 |

FOREIGN PATENT DOCUMENTS

| | | |
|---|---|---|
| KR | 1020080043576 A | 5/2008 |
| KR | 1020080051015 A | 6/2008 |
| KR | 2008-0069693 A | 7/2008 |
| KR | 1020080088305 A | 10/2008 |
| KR | 1020090014927 A | 2/2009 |
| KR | 1020090037270 A | 4/2009 |

OTHER PUBLICATIONS

Kim et al., "Depth map quality for three-dimensional video," SPIE Stereoscopic Displays and Applications XX 7237.

Shibata et al., "The zone of comfort: Predicting visual discomfort with stereo displays," Jounal of vision 11.8 (2011).

Korean Office Action dated Sep. 9, 2015 for corresponding KR Application No. 10-2009-0094936.

* cited by examiner

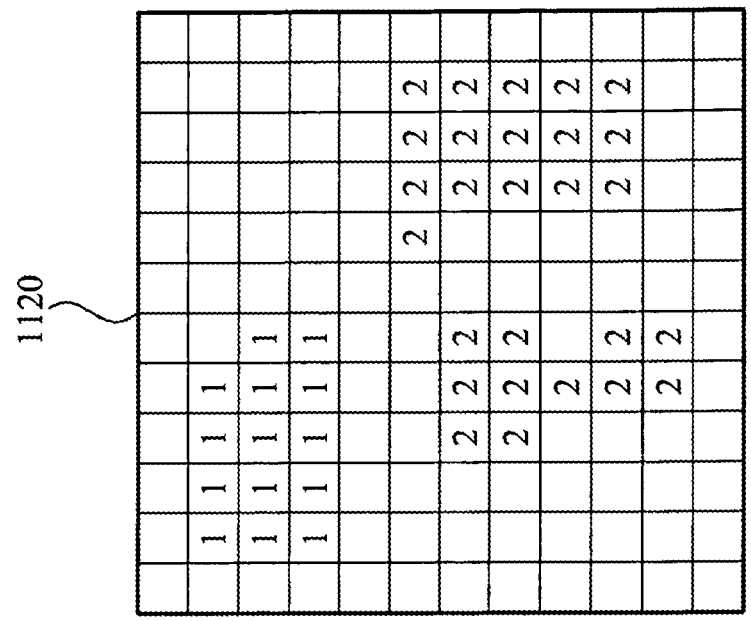
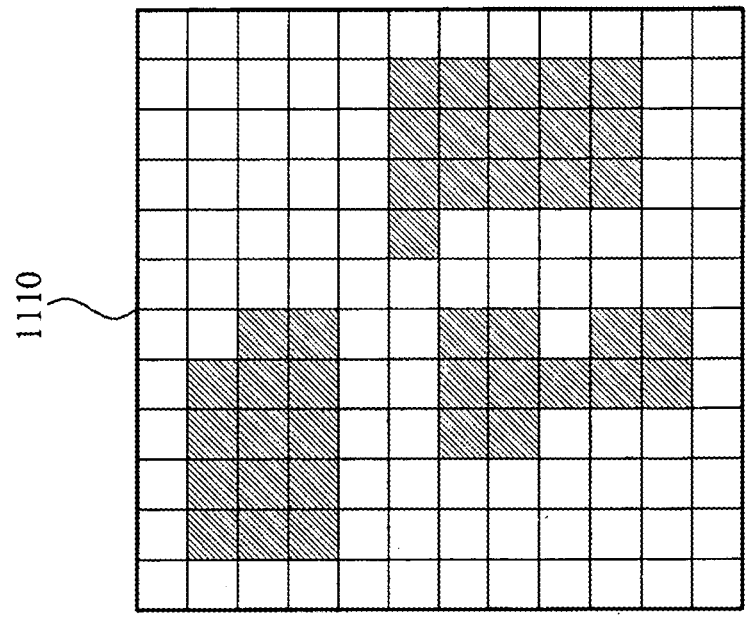
FIG. 11

APPARATUS AND METHOD FOR ADJUSTING DEPTH

CROSS-REFERENCE TO RELATED APPLICATIONS

This application is a Continuation of U.S. application Ser. No. 12/923,653, filed on Sep. 30, 2010, which claims priority under 35 U.S.C. §119 to Korean Patent Application No. 10-2009-0094936, filed on Oct. 7, 2009,in the Korean Intellectual Property Office, the disclosure of each of which is incorporated herein in its entirety by reference.

BACKGROUND

1. Field

Example embodiments of the present disclosure relate to a depth adjusting method and apparatus, and particularly, to a technology that adjusts a depth of a three-dimensional (3D) image using at least one of a spatial feature and a temporal feature of the 3D image.

2. Description of the Related Art

Research is being actively conducted to obtain a 3D display having a realistic 3D image. Examples of a 3D display include a glasses-type stereoscopic display that enables a user to view a 3D image with glasses and an autostereoscopic multi-view display that uses a parallax barrier and a lenticular lens. Both the glasses-type stereoscopic scheme and the autostereoscopic multi-view scheme may optically provide different images having a disparity to a left-eye and a right-eye of the user, thereby enabling the user to perceive a 3D image.

In the case of a two-dimensional (2D) display, an accommodation point where a real image is shown is identical to a convergence point on which the image is focused. In contrast, in the case of a 3D display, an accommodation point is not identical to a convergence point. Accordingly, the user may experience visual fatigue due to the disparity between the accommodation and the convergence points. The degree of disparity between the accommodation and the convergence increases as the degree of the depth of an input image increases, and thus, the degree of visual fatigue may increase accordingly.

Thus, there is a desire for research on a depth adjusting method and apparatus that may reduce visual fatigue while maintaining a stereoscopic effect.

SUMMARY

According to an aspect, a method of adjusting a depth in an input image is provided. The method includes extracting a depth map from the input image, adjusting the depth map of the input image to reduce viewer eyestrain by using at least one of spatial depth information and temporal depth information of the input image, and outputting the adjusted input image.

The extracting may include extracting one or more objects in the input image and extracting the spatial depth information by calculating an average depth value of the one or more objects.

The adjusting may include adjusting the average depth value based on a first conversion lookup table, selecting a function to adjust a depth value of an input image pixel according to the adjusted average depth value, and adjusting the depth value of the input image pixel based on the selected function.

The extracting may include extracting one or more objects in a current frame, and calculating an average depth value of one or more objects in the current frame, and extracting the temporal depth information by calculating a difference between an average depth value of the objects in the current frame and an average depth value of objects of a previous frame.

The adjusting of the depth map may include comparing the difference between the average depth values with a first threshold, adjusting the average depth value of the objects in the current frame based on a second conversion lookup table, when the difference between the average depth values is greater than the first threshold, selecting a function to adjust a depth value of an input image pixel based on the adjusted average depth value of the objects in the current frame, and adjusting the depth value of the input image pixel based on the selected function.

The extracting of the depth map may include extracting one or more objects in a current frame, extracting the spatial depth information by calculating an average depth value of the one or more objects in the current frame, and extracting the temporal depth information by calculating a difference between an average depth value of the one or more objects in the current frame and an average depth value of objects of a previous frame, and the adjusting of the depth map may include extracting a first change average value, the first change average value being obtained by adjusting the average depth value of the one or more objects in the current frame based on a first conversion lookup table, selecting a first function to adjust a depth value of an input image pixel according to the first change average value, adjusting the depth value of the input image pixel based on the first function, comparing the difference between the average depth values with a first threshold value, extracting a second change average value, the second change average value being obtained by adjusting the average depth value of the one or more objects in the current frame based on a second conversion lookup table, when the difference between the average depth values is greater than the first threshold value, selecting a second function to adjust the depth value of the input image pixel based on the second change average value, and adjusting the depth value of the input image pixel based on the second function.

The adjusting may include receiving an output mode input from a user, and adjust a depth value of a pixel of the input image in response to the inputting of the user.

According to another aspect, there is provided a method of adjusting a depth in a depth image, the method may include separating, by way of a processor, objects and a background in a depth image, selecting an object satisfying a predetermined condition from among the separated objects, assigning a label for the selected object, matching the object for which the label is assigned with an object of a previous frame, and calculating a difference between depth values of the matched objects, and scaling a depth value of the object for which the label has been assigned based on the difference.

According to still another aspect, there is provided an apparatus adjusting a depth in an input image. The apparatus may include a depth map extracting unit to extract a depth map from the input image, and a depth map adjusting unit to adjust the depth map of the input image to reduce viewer eyestrain by using at least one of spatial depth information and temporal depth information of the input image.

According to another aspect, there is provided a method of enhancing depth in an input image. The method may include calculating, by way of a processor, an average depth value of one or more objects that are extracted from the input image, adjusting the calculated average depth value based on a first conversion lookup table, selecting a function to adjust a depth value of an input image pixel according to the adjusted average depth value, and adjusting the depth value of the input image pixel based on the selected function to reduce viewer eyestrain.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 11 is a diagram illustrating a process of assigning a label for an object according to example embodiments;

DETAILED DESCRIPTION

Figure 1:
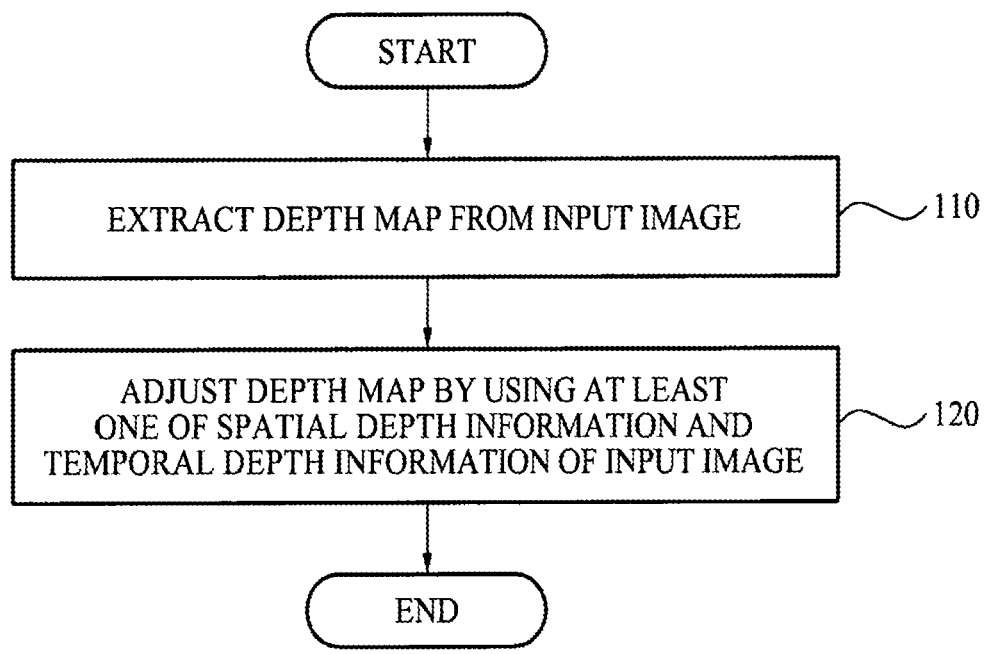
FIG. 1 is a flowchart illustrating a depth adjusting method according to example embodiments.

Reference will now be made in detail to embodiments, examples of which are illustrated in the accompanying drawings, wherein like reference numerals refer to the like elements throughout. Embodiments are described below to explain the present disclosure by referring to the figures FIG. 1 illustrates a depth adjusting method according to example embodiments.

Referring to FIG. 1, a depth map may be extracted from an input image in operation 110. When the depth map is extracted, at least one of spatial depth information and temporal depth information of the input image may be extracted. An example of operation 110 will be described in detail with reference to FIG. 2.

Figure 2:
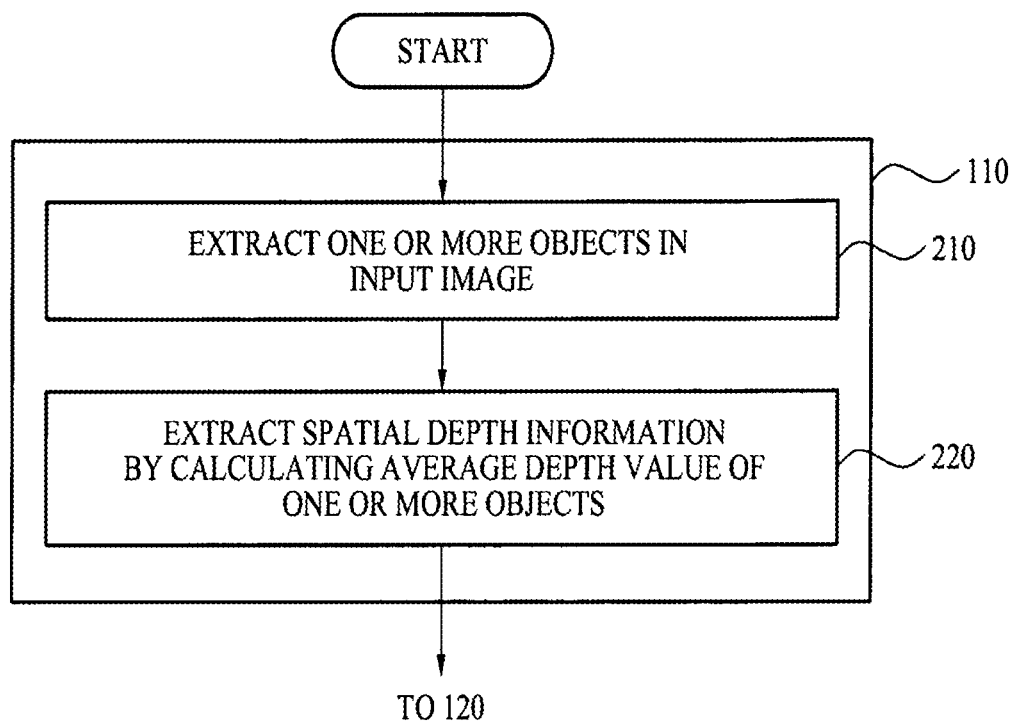
FIG. 2 is a flowchart illustrating an example of a process of extracting a depth map in the depth adjusting method of FIG. 1.

FIG. 2 illustrates an example of a process of extracting a depth map in the depth adjusting method of FIG. 1.

Referring to FIG. 2, one or more objects in the input image may be extracted in operation 210. To extract one or more objects, a background and objects in the input image may be separated, and depth values of the separated one or more objects may be extracted. In this instance, the background and the objects may be separated using a depth image. That is, in the depth image, objects typically have larger depth values and the background typically has smaller depth values. Therefore, the objects are extracted from the depth image based on a difference between the depth values.

In operation 220, spatial depth information may be extracted by calculating an average depth value of the one or more objects. In this instance, the average depth value may be a parameter to adjust a depth of the input image.

Referring again to FIG. 1, the depth map of the input image may be adjusted using at least one of the spatial depth information and the temporal depth information of the input image in operation 120. First, to adjust the depth map of the input image using the spatial depth information, an average depth value of objects in the input image is calculated, and when the average depth value is large, a depth of the image may be decreased. Also, to adjust the depth map of the input image using the temporal depth information, a difference between a depth of a previous frame and a depth of a current frame is calculated, and when the difference is large, a depth value of the current frame may be adjusted to decrease the difference between the depths of the frames.

Here, operation 120 includes an operation of receiving an output mode input from a user and an operation of adjusting a depth value of a pixel of the input image in response to the inputting of the user. Accordingly, the output mode is input from the user, and one of a depth decrease, a depth increase, and a maintenance of an original image is selected based on the input mode, Also, selectable modes may be composed of various modes, and the user may select one of the various modes and may adjust a depth of the depth image in detail. Here, an example of operation 120 will be described in detail with reference to FIGS. 3 through 5.

Figure 3:
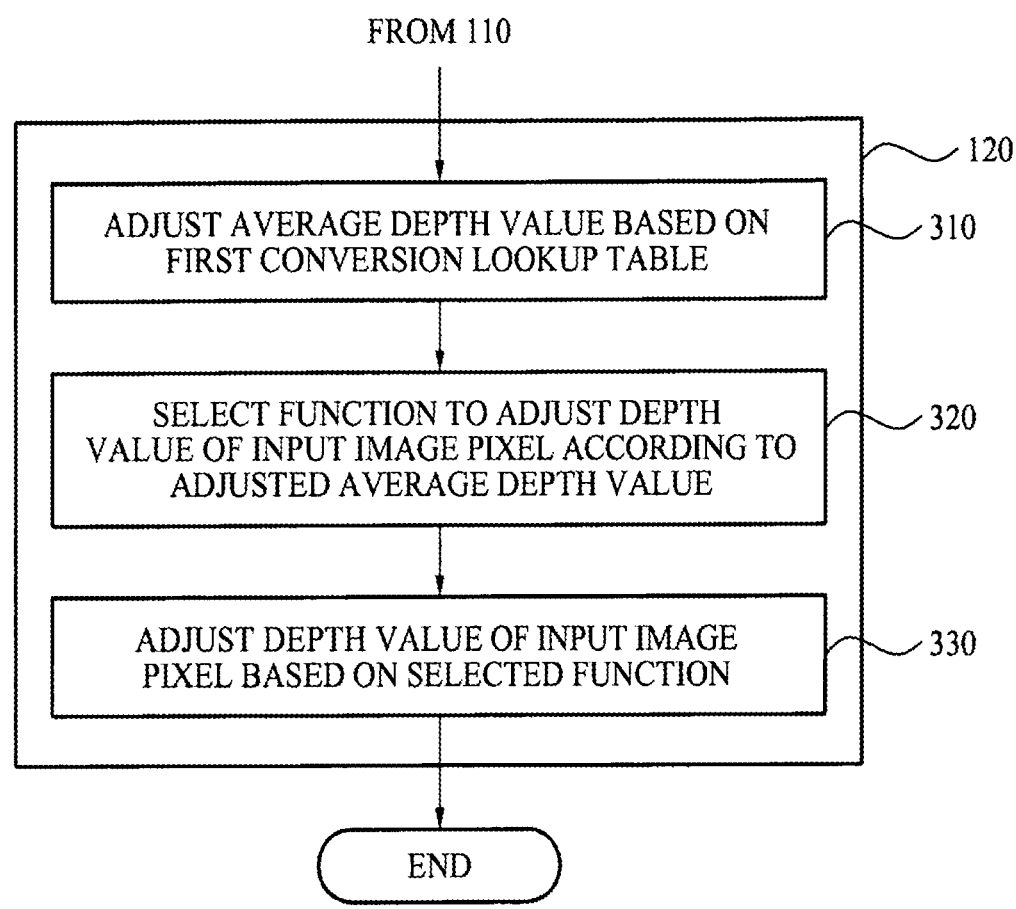
FIG. 3 is a flowchart illustrating an example of a process of adjusting a depth map in the depth adjusting method of FIG. 1.

FIG. 3 is a flowchart illustrating an example of a process of adjusting a depth map in the depth adjusting method of FIG. 1.

Referring to FIG. 3, an average depth value may be adjusted based on a first conversion lookup table in operation 310. Here, the example that converts the average depth value based on a first conversion lookup table may be expressed as given in Equation 1 below.

$$d_{ms} = \text{LUT}(d_{mean}) \qquad \text{Equation 1:}$$

Here, $d_{mean}$ is an average depth value of objects, and $d_{ms}$ is a value that is changed based on the first conversion lookup table (LUT).

Figure 4:
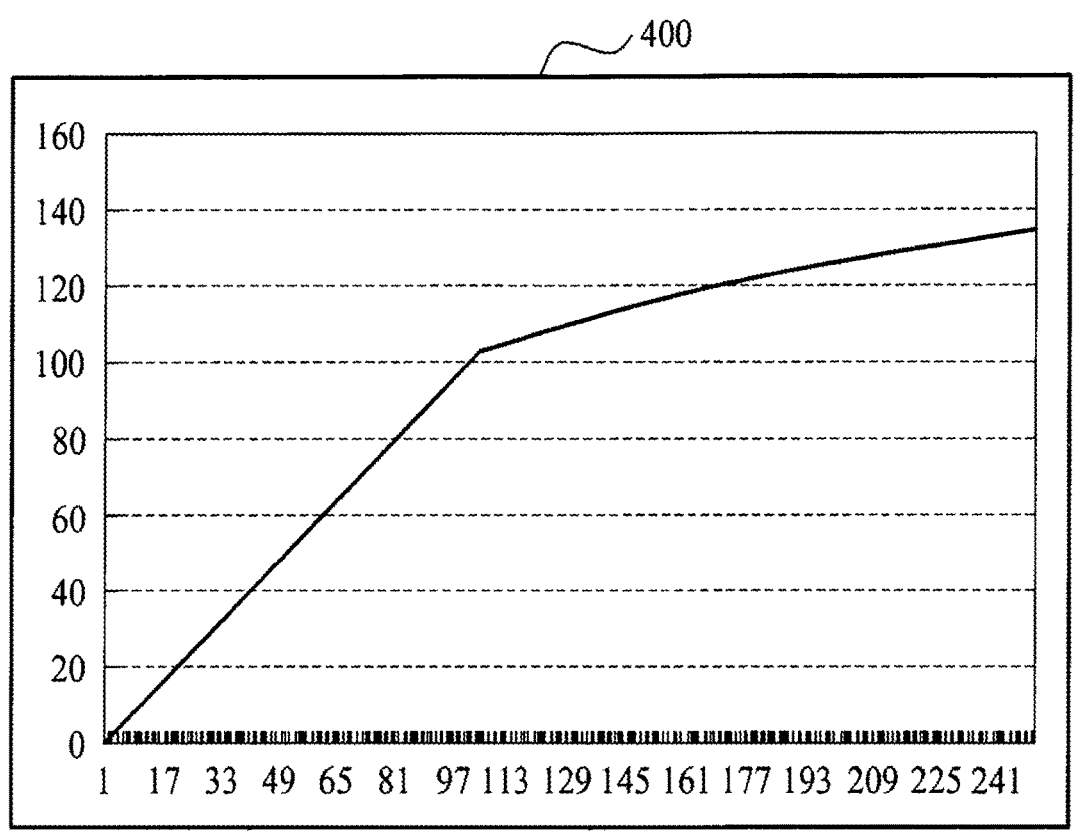
FIG. 4 is a diagram illustrating a function to change an average depth value according to example embodiments.

FIG. 4 illustrates values of the first conversion LUT according to example embodiments as a graph 400. Here, a horizontal axis of the graph 400 is an average depth value of objects and a vertical axis of the graph 400 is an adjusted average depth value.

To reduce visual fatigue, the average depth value may be decreased when the average depth value is greater than or equal to a threshold, e.g., a predetermined threshold, and the average depth value may be maintained when the average depth value is less than the threshold. That is, an image having a small average depth value may not cause visual fatigue, and thus, the average depth value of the objects may not be changed. In other words, only the image having a larger average depth value may be changed.

Referring again to FIG. 3, a function to adjust a depth value of an input image pixel may be selected based on an adjusted average depth value in operation 320.

In operation 330, a depth value of the input image pixel may be adjusted based on the selected function. Accordingly, a function to adjust a depth value of each pixel of the input image may be selected based on the adjusted average depth value, and a depth value of each pixel may be adjusted. The function selected based on the adjusted average depth value may be further described with reference to FIG. 5.

Figure 5:
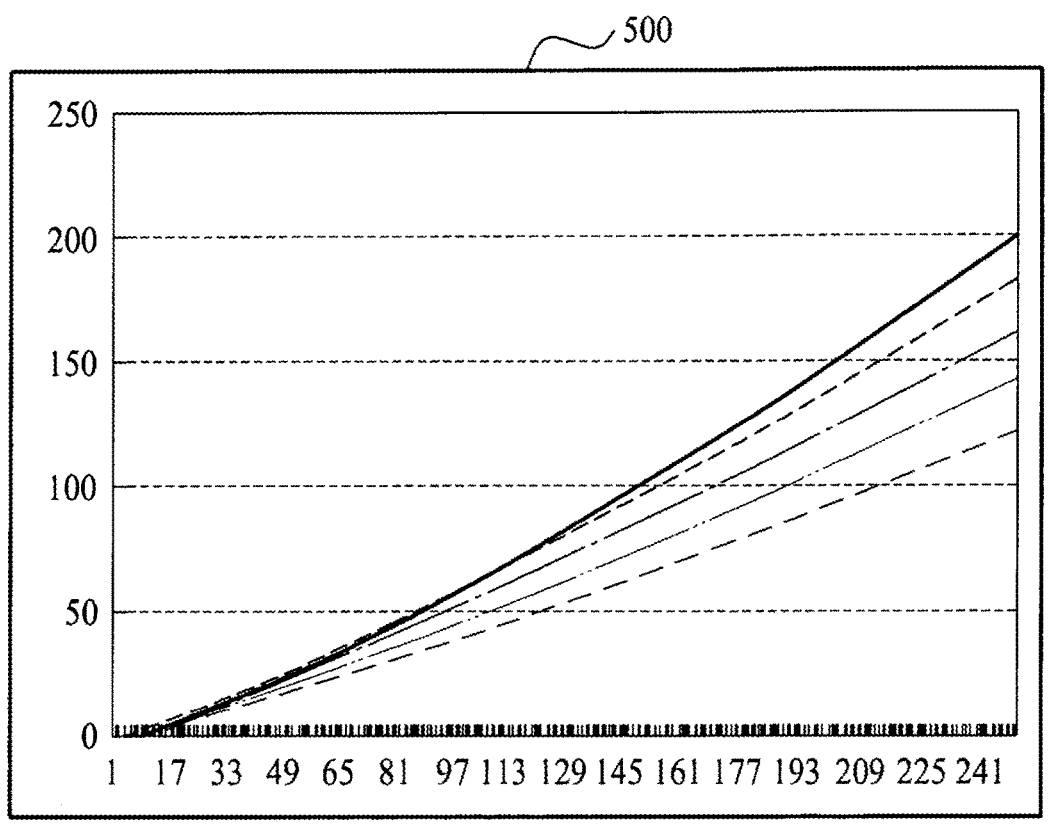
FIG. 5 is a diagram illustrating a function to change a depth value of a pixel according to example embodiments.

FIG. 5 illustrates a function to change a depth value of a pixel according to example embodiments.

Referring to FIG. 5, a horizontal axis of a graph 500 is a depth value of an input pixel, and a vertical axis is an adjusted depth value. A function to adjust a depth value of an input image may be selected based on $d_{ms}$ calculated by Equation 1 and the selected function may be calculated. That is, in Equation 1, $d_{ms}$ may be determined based on the average depth value of objects and the function to adjust a depth value of a pixel may be selected based on the determined $d_{ms}$. The adjusting of the depth value of the pixel based on the selected function may be performed according to Equation 2 as given below.

$$d_s(x, y) = f_s(d_{in}(x, y), d_{ms})$$ Equation 2:

Here, x is an abscissa and y is an ordinate of an input image, $d_{in}(x,y)$ is a depth value of each pixel of the input image, and $d_{ms}$ is an average depth value that is changed based on a lookup table.

Here, adjusting of a depth value may be performed with respect to all pixels of the input image or may be performed only on pixels of the objects of the input image.

In this instance, while the adjusting of the depth value may be performed only on the pixels of the objects of the input image, an image on which a depth is finally adjusted may be generated by merging depth information of an object on which a depth has been finally adjusted and depth information of a background on which a depth has not been adjusted.

Figure 6:
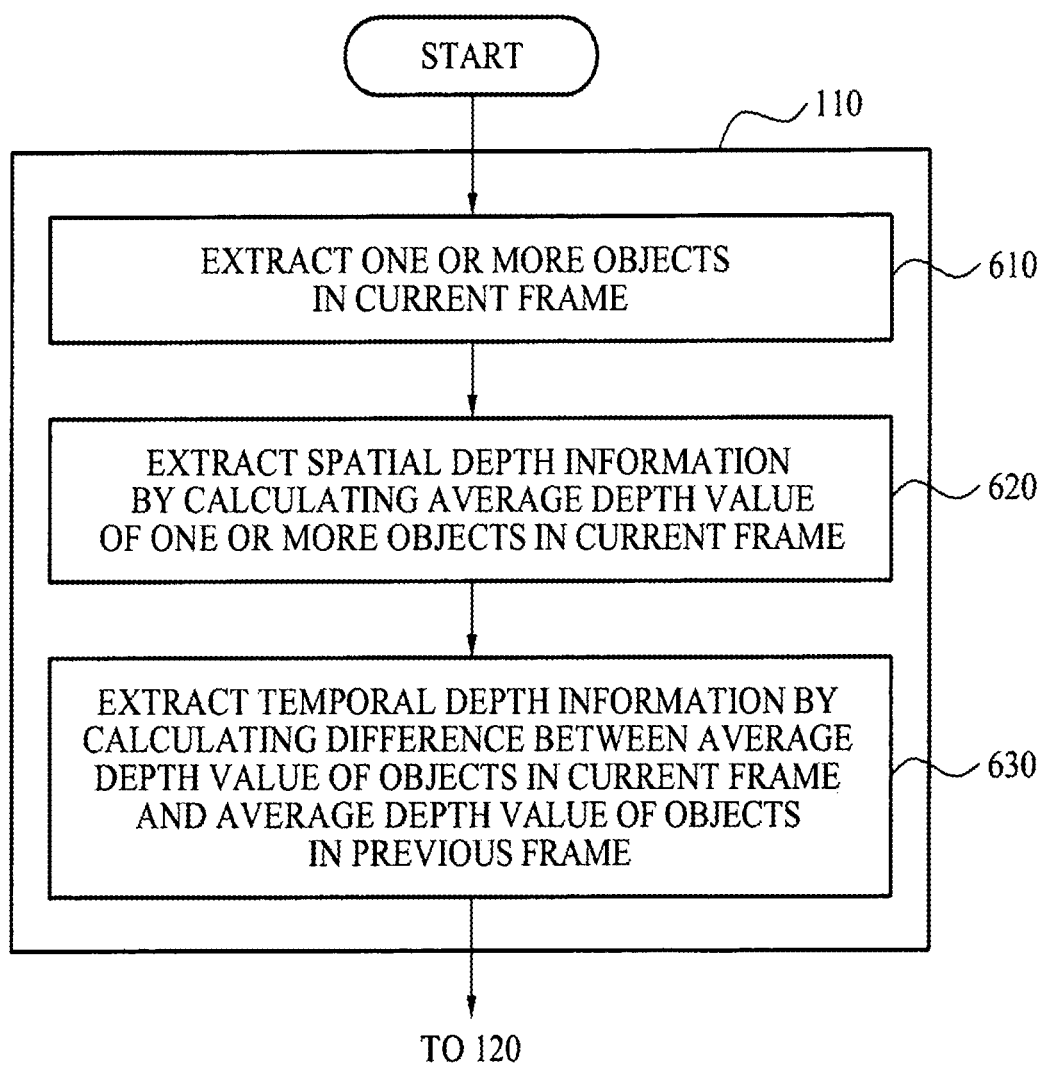
FIG. 6 is a flowchart illustrating another example of a process of extracting a depth map in the depth adjusting method of FIG. 1.

FIG. 6 is a flowchart illustrating another example of a process of extracting a depth map in the depth adjusting method of FIG. 1. In FIG. 6, an average depth value of objects in a current frame and an average depth value of objects in a previous frame may be compared to adjust a depth map using temporal depth information.

In operation 610, one or more objects in the current frame may be extracted. That is, one or more objects may be extracted by separating objects and the background in the same manner as spatial depth information.

In operation 620, an average depth value of the one or more objects in the current frame may be calculated.

In operation 630, the temporal depth information may be extracted by calculating a difference between the average depth value of the objects in the current frame and the average depth value of objects in the previous frame. That is, when a depth value between consecutive frames changes rapidly, visual fatigue may increase. Accordingly, when a difference between average depth values of objects of consecutive frames is high, the depth value of the current frame may be adjusted to reduce the visual fatigue.

Figure 7:
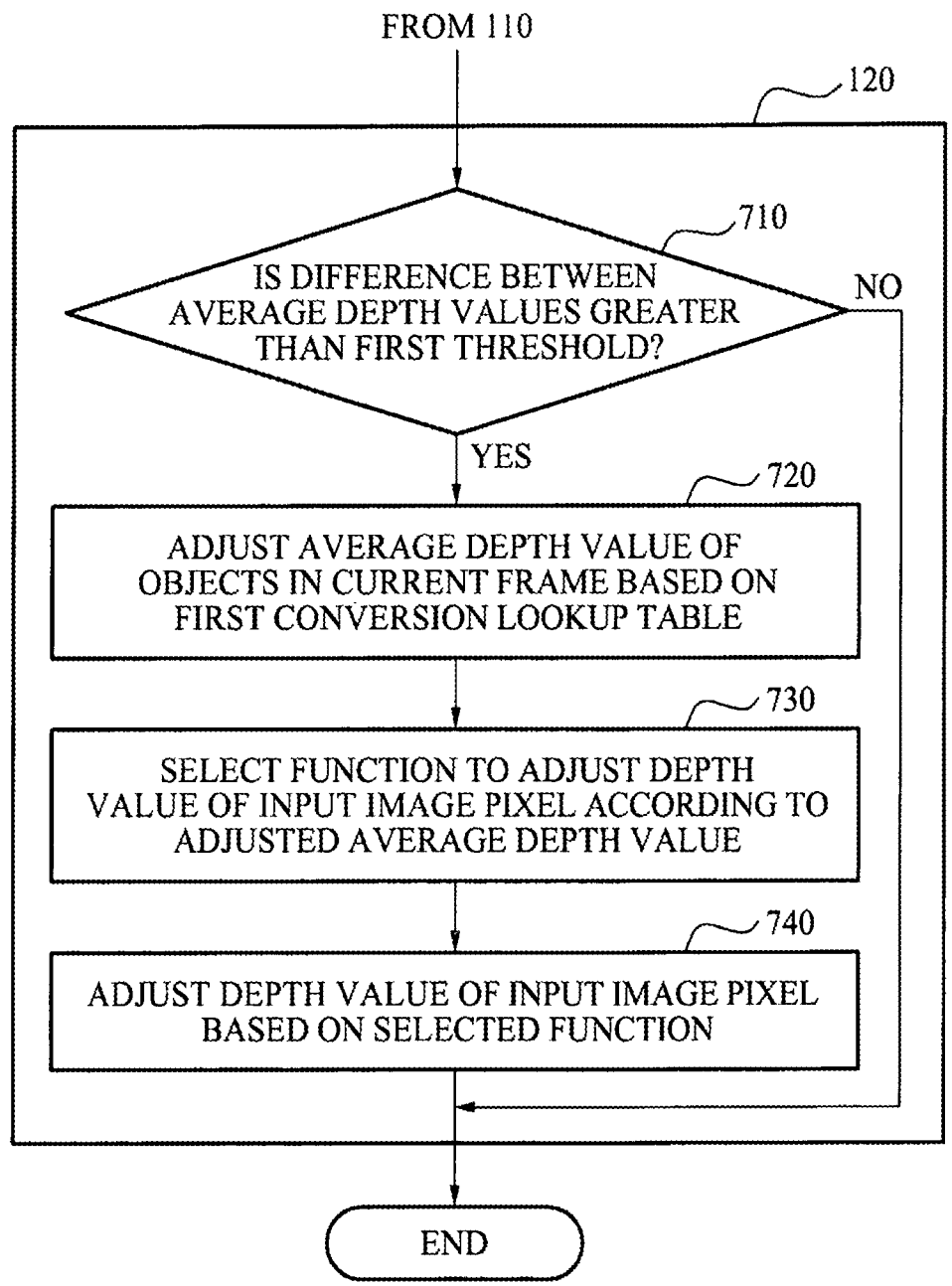
FIG. 7 is a flowchart illustrating another example of a process of adjusting a depth map in the depth adjusting method of FIG. 1.

FIG. 7 is a flowchart illustrating another example of a process of adjusting a depth map in the depth adjusting method of FIG. 1.

Referring to FIG. 7, a difference between average depth values of objects, e.g., corresponding objects, of two consecutive frames may be compared with a first threshold in operation 710. That is, the difference between the average depth values of the objects of the consecutive two frames may be compared with the predetermined first threshold, and a result of the comparison determines whether to adjust the depth value of the current frame.

In operation 720, when the difference between the average depth values is greater than the first threshold, the average depth value of the objects in the current frame may be adjusted based on a second conversion lookup table. That is, when the difference between the average depth values is greater than the first threshold, the average depth value of the current frame may be adjusted based on the second conversion lookup table to reduce the difference between average depth values of the consecutive two frames.

Here, the average depth value of the current frame may be adjusted based on Equation 3 below.

$$d_{cur}^{ms} = d_{pre}^{ms} + \alpha \cdot d_{diff}$$ Equation 3:

Here, $d_{pre}^{ms}$ is an average depth value of the objects in the previous frame and a is a weighting parameter having a range of −1 to 1. The range of 1 to 0 is used for decreasing a depth and the range of 0 to 1 is used for increasing the depth. Also, $d_{cur}^{ms}$ indicates an average depth value adjusted in the current frame, and $d_{diff}$ is a difference between the average depth value of the current frame and the average depth value of the previous frame.

In operation 730, a function to adjust a depth value of an input image pixel may be selected according to the adjusted average depth value. Here, the adjusting of the depth using the selected function may be calculated based on Equation 4 as given in Equation 4 below.

$$d_{cur}^t(x, y) = f_t(d_{cur}(x, y), d_{cur}^{ms})$$ Equation 4:

Here, $d_{cur}(x, y)$ is a depth value corresponding to a pixel located at (x, y) in the current frame, and $d_{cur}^t(x, y)$ is a pixel value of which a depth is adjusted based on the selected function.

In operation 740, the depth value of the input image pixel may be adjusted based on the selected function. Here, the adjusting of the depth value of the input image pixel may be performed with respect to all pixels of the input image or may be performed only on pixels of objects of the input image in the same manner as in the case of utilizing the spatial depth information.

In this instance, when the adjusting of the depth value is performed only on the pixels of the objects of the input image, an image for which a depth is finally adjusted may be generated by merging depth information of an object on which a depth has been finally adjusted and depth information of a background on which the depth has not been adjusted.

The process of adjusting the depth map using the spatial depth information or temporal depth information has been described. However, the depth map may be adjusted using both the spatial depth information and the temporal depth information according to other example embodiments.

As an example, adjusting of the depth using the spatial depth information is performed first, and then, adjusting of the depth using the temporal depth information is performed. To perform the above, a difference between an average depth value for which a depth has been adjusted based on spatial depth information in the current frame and an average depth value for which a depth has been adjusted based on spatial depth information in the previous frame may be calculated. Subsequently, a function to adjust a pixel by using the difference between the average depth values, and a depth value of a pixel of the input image may be adjusted using the selected function.

Figure 8:
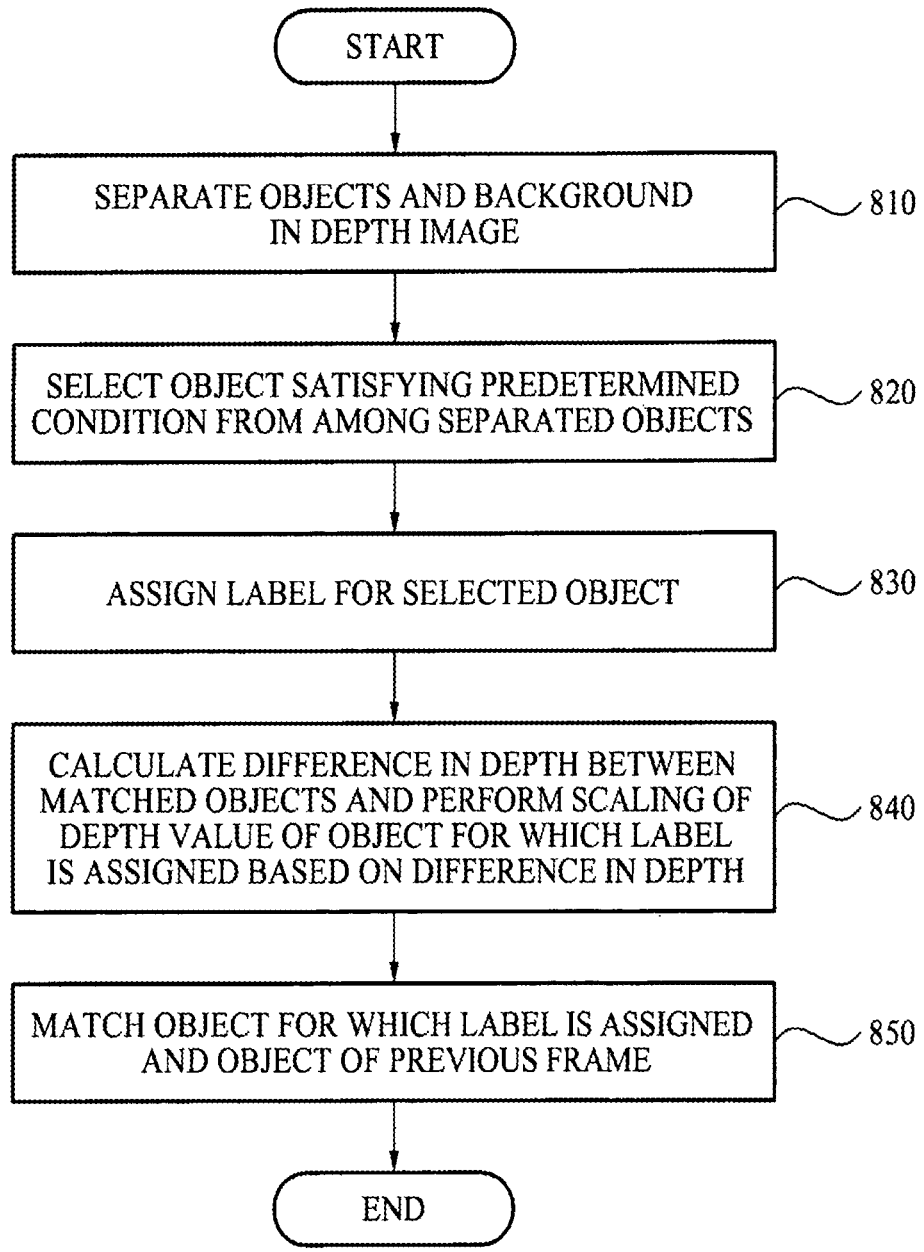
FIG. 8 is a flowchart illustrating a depth adjusting method according to other example embodiments.

FIG. 8 is a flowchart illustrating a depth adjusting method according to other example embodiments.

Referring to FIG. 8, objects and a background are separated in a depth image in operation 810. As an example, the objects and the background may be separated using different features of depth values of the objects and the background. That is, the objects may have larger depth values and the background may have smaller depth values, and thus, the objects may be extracted from the depth image using a difference between the depth values. Here, for example, the objects and the background may be separated based on a mean shift segmentation algorithm using a probability density function.

In operation 820, an object satisfying a predetermined condition may be selected from among the separated objects. Here, the predetermined condition may relate to a location and a size of the object. As an example, an object that is located at the center of an image and has a large size may be selected from among the separated objects, using a Gaussian weight with respect to the location of the image. To perform the above, operation 820 may include an operation of calculating a score for each of the objects by applying a location information weight function to each of the objects, the location information weight function assigning a weight according to a location of a pixel, and an operation of selecting an object of which a calculated score is greater than or equal to a predetermined value. That is, the score of the object may be calculated based on a weighted location value, and a size of the object, and only the object for which the calculated score is greater than or equal to a predetermined threshold may be selected.

In this instance, the process of selecting the object will be described in detail with reference to FIG. 9 and FIG. 10.

Figure 9:
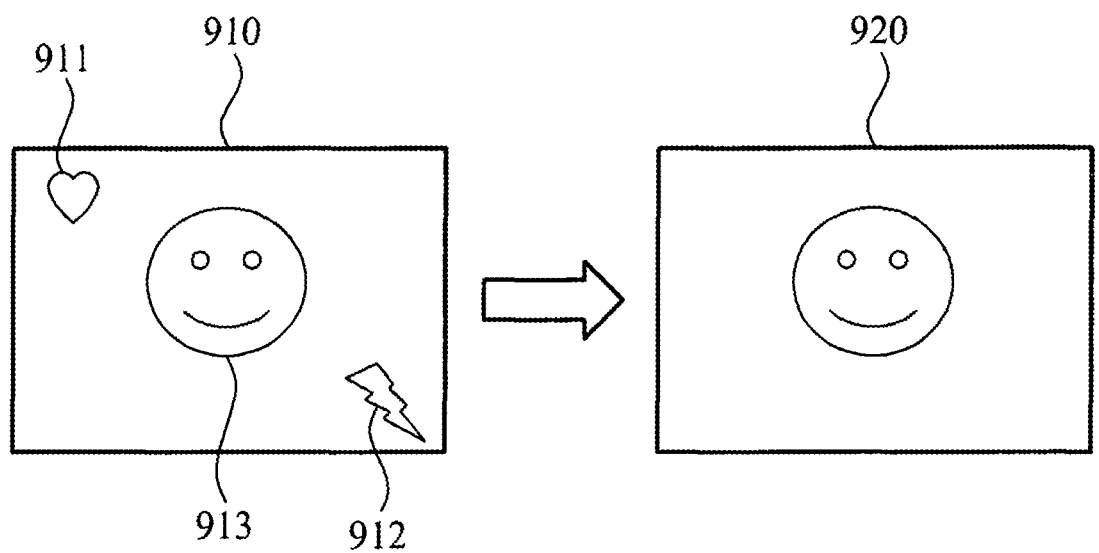
FIG. 9 is a diagram illustrating a process of selecting an object according to example embodiments.
Figure 10:
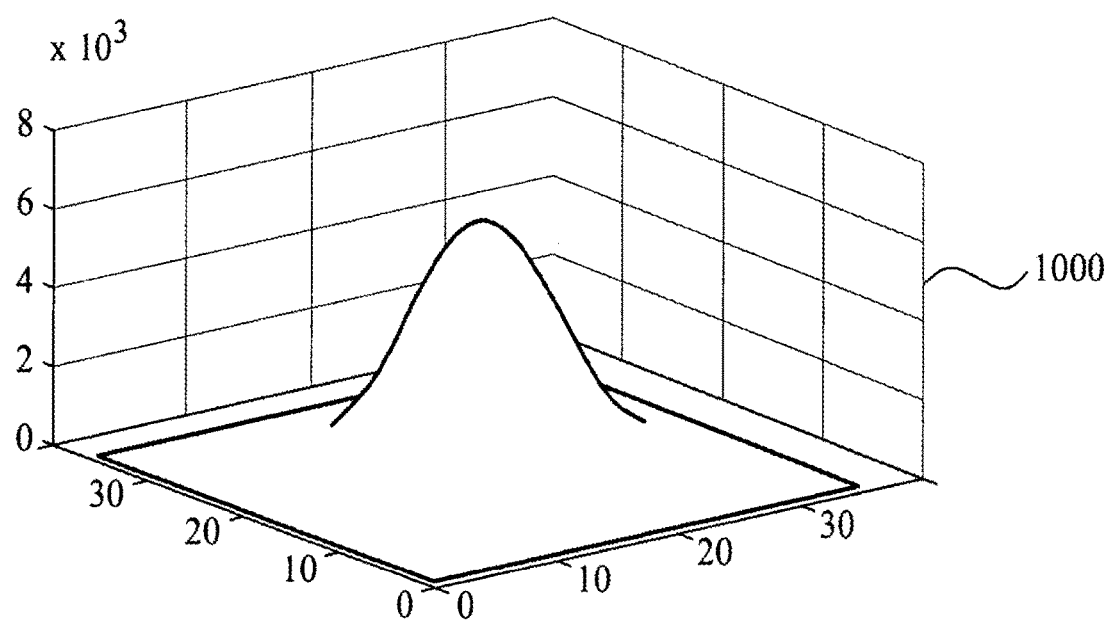
FIG. 10 is a diagram illustrating a location information weight function of a pixel according to example embodiments.

Referring to FIG. 9, an object that is located at a center of an image and has a large size may be selected to adjust a depth. To perform the above, a larger weight is assigned by using a location information weight function 1000 of FIG. 10 as the object is closer to the center of the image to count pixels, and a smaller weight is assigned as the object is closer to an edge of the image, thereby decreasing a probability of selecting the object. That is, to select the object, an object 913 that is at the center of the image 910 and has a relatively large weighting value may be selected, and objects 911 and 912 that are at the edge of the image 910 and have smaller weighting values may not be selected. Accordingly, the object at the center and having a large size may be extracted from the selected image 920.

Referring again to FIG. 8, in operation 830, a label may be assigned for the selected object. As an example, when there is a plurality of objects satisfying the predetermined condition, the objects are labeled so as to be distinguished. Here, operation 830 will be further described with reference to FIG. 11.

FIG. 11 is a diagram illustrating a process of assigning a label for an object according to example embodiments.

FIG. 11 illustrates a binary image 1110 and a labeled image 1120. A sequential labeling method may be used in example embodiments and a label of a current pixel may be determined by searching for a label of a top pixel and a label of a left pixel of each foreground pixel. Each area may be distinguished as a unique label value through the above process, and thus, a feature value of each area, such as a size, a location, a direction, a circumference, and the like, is extracted.

In operation 840, an object to which a label has been assigned may be matched to an object of a previous frame. That is, a label of an object of a current frame may be one-to-one matched with a label of an object of the previous frame. To perform the above, operation 840 may include an operation of calculating a difference between an average RGB value of each of the objects in the current frame and an average RGB value of each of the objects in the previous frame, and an operation of matching objects having a minimum difference between average RGB values. Accordingly, the objects having the minimum difference between the average RGB values may be determined as identical objects, and thus the two objects may be matched. Here, the matching of the objects will be further described with reference to FIG. 12.

Figure 12:
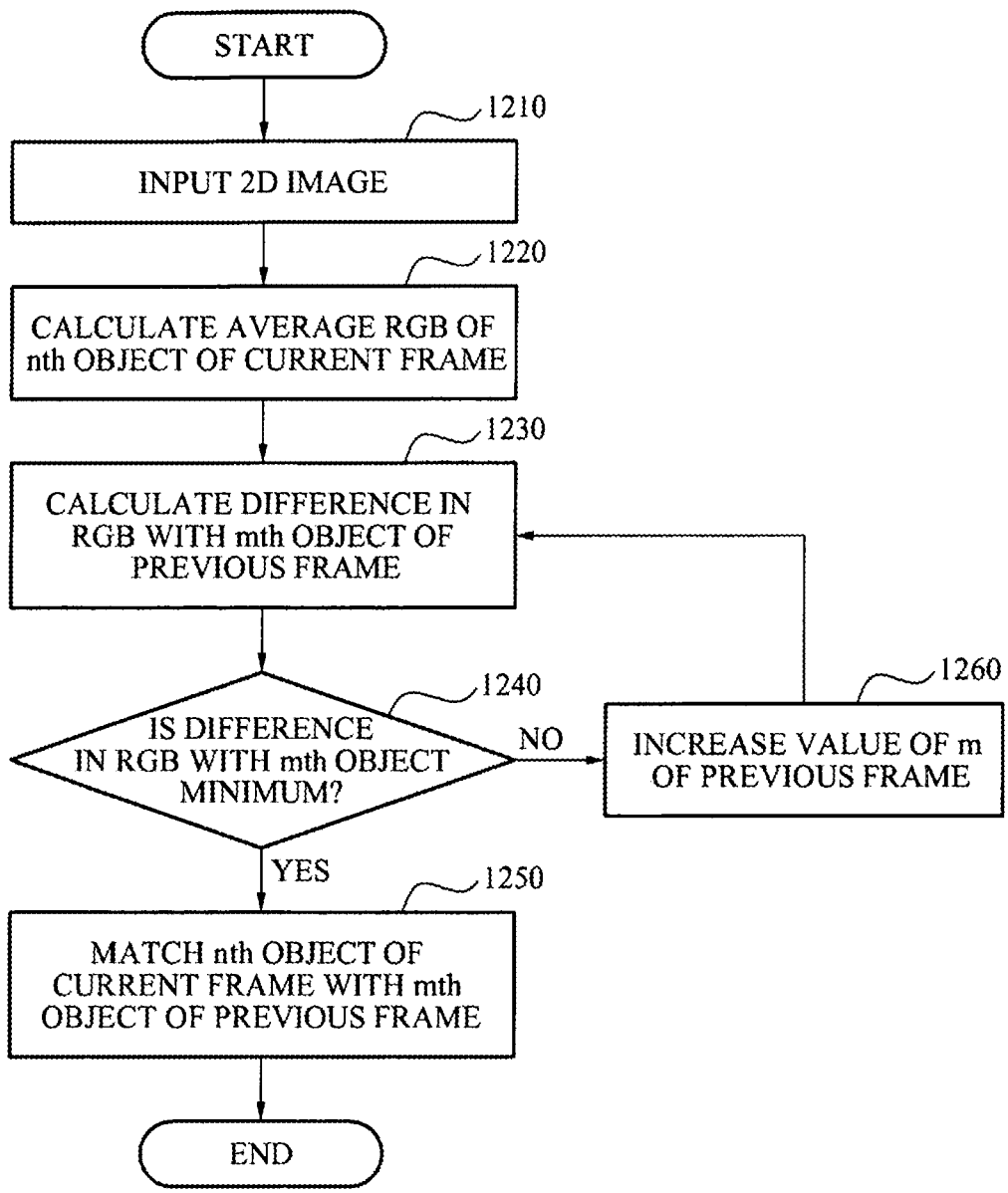
FIG. 12 is a diagram illustrating a process of matching objects according to example embodiments.

FIG. 12 illustrates a process of matching objects according to example embodiments.

A 2D color image may be used as an input image for matching the objects, since an RGB pixel value of a same object is maintained even when a depth is changed when a frame is changed.

The 2D image is received in operation 1210, and an RGB average of an $n^{th}$ object of the current frame is calculated in operation 1220.

In operation 1230, a difference between the RGB average of the $n^{th}$ object of the current frame and an RGB average of an $m^{th}$ object of a previous frame is calculated.

In operation 1240, whether the difference with the $m^{th}$ object is a minimum is determined compared with differences with average RGB of other objects of the previous frames.

In operation 1250, when the difference with the $m^{th}$ object is at a minimum compared with the differences with the average RGB of the other objects of the previous frames, the $n^{th}$ object of the current frame and the $m^{th}$ object of the previous frame are matched.

In operation 1260, when the difference with the $m^{th}$ object is not a minimum compared with the differences with the average RGB of the other objects of the previous frames, a value of m of the previous frame is increased to calculate a difference with an average RGB of another object.

Figure 13:
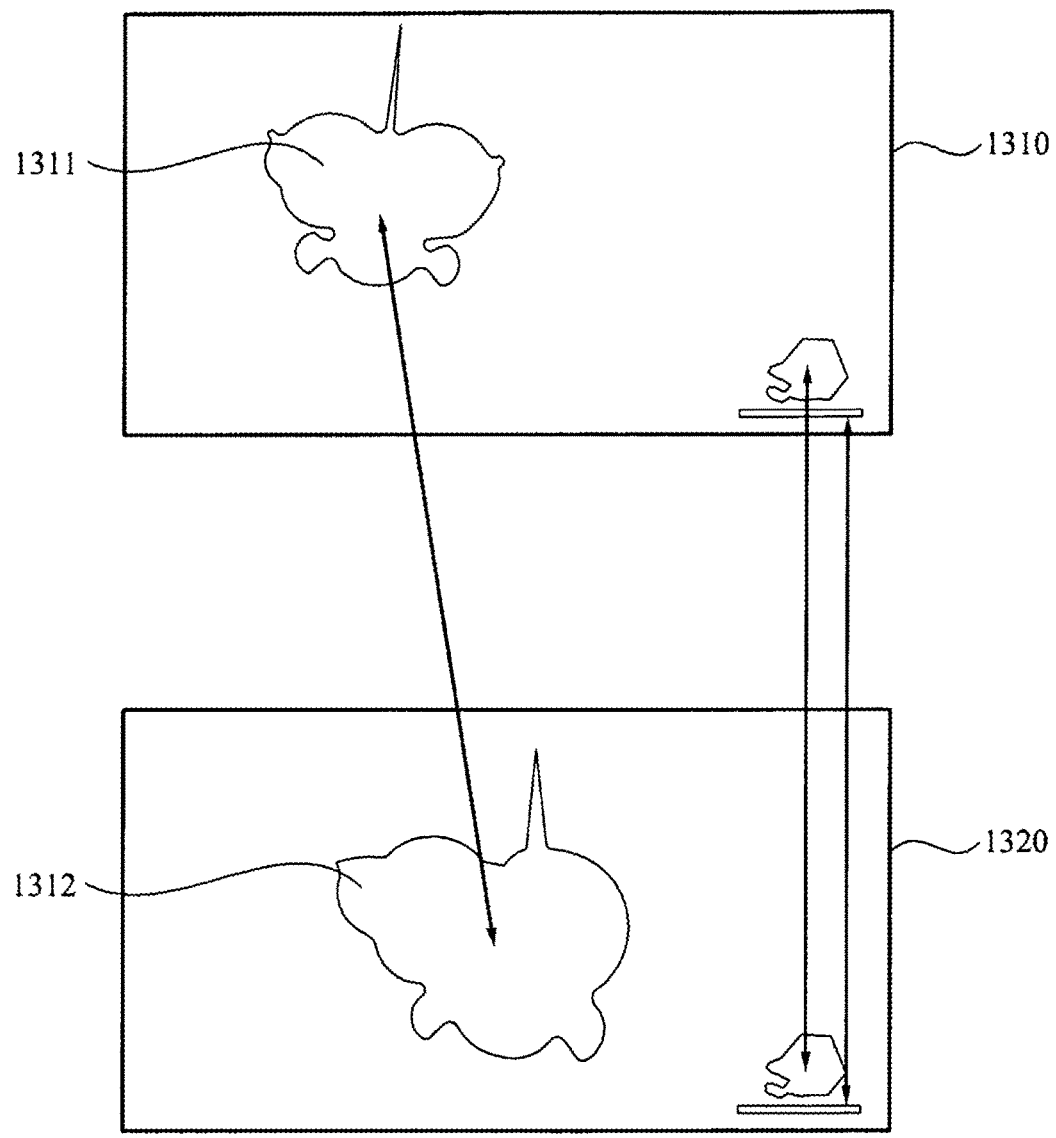
FIG. 13 is a diagram illustrating an object-matched image according to example embodiments.

FIG. 13 illustrates an object-matched image according to example embodiments.

A difference between an average ROB value of each of the objects in a current frame and an average ROB value of each of the objects in a previous frame may be calculated and FIG. 13 illustrates a result of matching objects having a minimum difference between average RGB values. As an example, object 1311 of the previous frame 1310 is identical to object 1312 of the current frame, and thus, the two objects are matched with each other.

Referring again to FIG. 8, a difference in depth between the matched objects is calculated in operation 850, and a depth value of the object for which the label has been assigned may be scaled based on the difference in depth. That is, a depth may be adjusted by selecting only an object area having a great variation in depth without adjusting all pixels of an input image, thereby reducing visual fatigue without deteriorating a stereoscopic effect. Here, operation 850 may include an operation of setting an initial depth value with respect to each object, an operation of calculating a difference between depth values of the matched objects in the current frame and the previous frame, and an operation of scaling the object of the current frame using the initial depth value and the difference between the depth values.

Also, the scaling of the object may calculate the depth value of the object of the current frame by summing the initial depth value to a value being obtained by multiplying a predetermined constant by the difference between the depth values.

Figure 14:
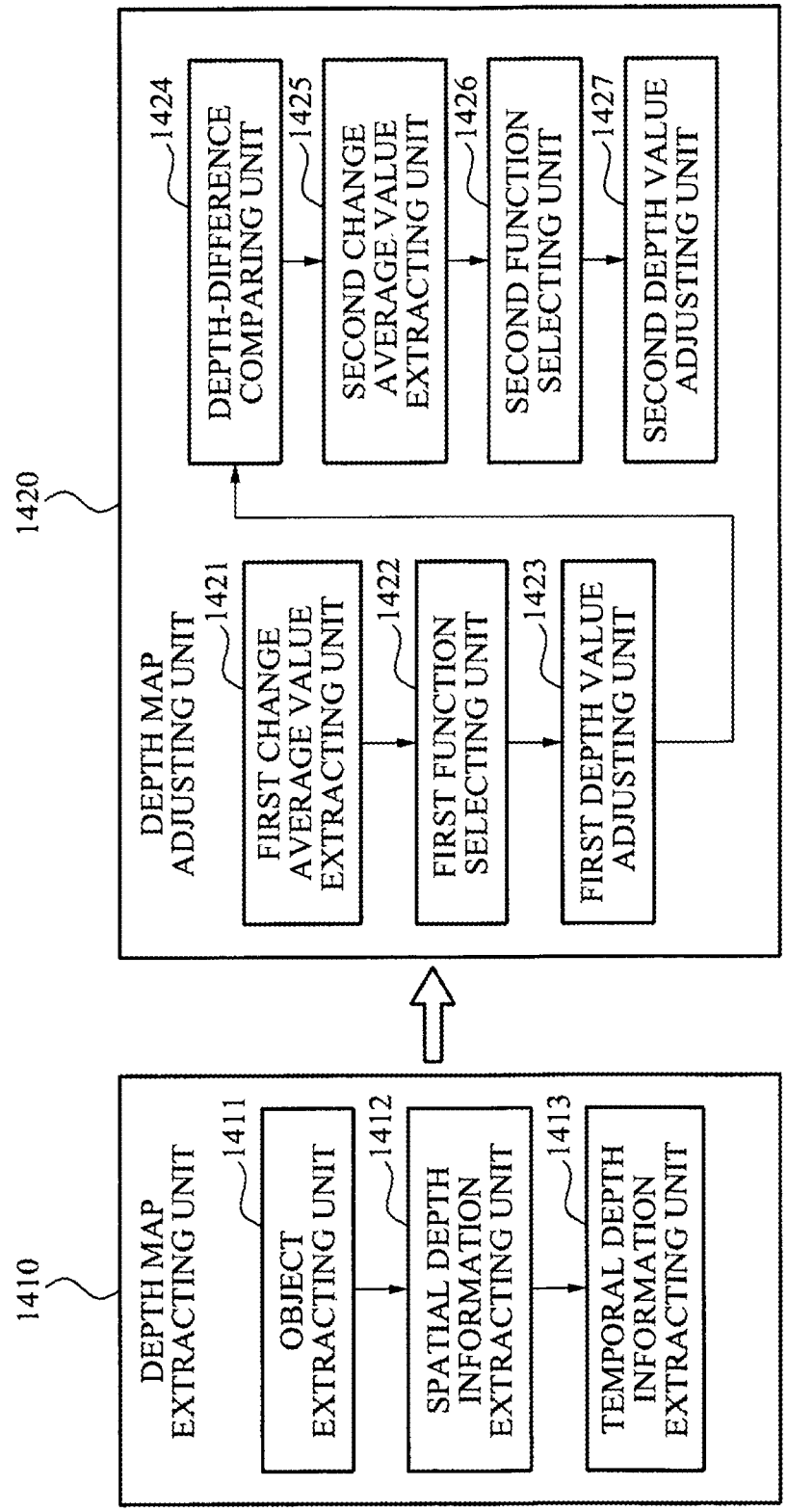
FIG. 14 is a block diagram illustrating a depth adjusting apparatus according to example embodiments.

FIG. 14 illustrates a depth adjusting apparatus according to example embodiments.

Referring to FIG. 14, a depth adjusting apparatus 1400 may include a depth map extracting unit 1410 and a depth map adjusting unit 1420.

The depth map extracting unit 1410 may extract a depth map from an input image. In this instance, the depth map extracting unit 1410 may include an object extracting unit 1411, a spatial depth information extracting unit 1412, and a temporal depth information extracting unit 1413.

The object extracting unit 1411 may extract one or more objects in the input image and the spatial depth information extracting unit 1412 may extract the spatial depth information by calculating an average depth value of the one or more objects.

The temporal depth information extracting unit 1413 may extract the temporal depth information by calculating a difference between an average depth value of objects in a current frame and an average depth value of objects in a previous frame.

Accordingly, a depth map may be adjusted using at least one of the spatial depth information and the temporal depth information to reduce visual fatigue.

The depth map adjusting unit 1420 may adjust the depth map of the input image using at least one of the spatial depth information and the temporal depth information of the input image. Here, the depth map adjusting unit 1420 may include a first change average value extracting unit 1421, a first function selecting unit 1422, a first depth value adjusting unit 1423, a depth-difference comparing unit 1424, a second change average value extracting unit 1425, and a second function selecting unit 1426, and a second depth value adjusting unit 1427.

The first change average value extracting unit 1421 may extract a first change average value, the first change average value being obtained by adjusting the average depth value of the objects in the current frame based on a first conversion lookup table.

The first function selecting unit 1422 may select a first function to adjust a depth value of an input image pixel according to the first change average value.

The first depth value adjusting unit 1423 may adjust the depth value of the input image pixel according to the first function.

Accordingly, the first change average value extracting unit 1421, the first function selecting unit 1422, and the first depth value adjusting unit 1423 may adjust the depth value of the input image pixel using the spatial depth information.

The depth-difference comparing unit 1424 may compare the difference between the average depth value of the current frame and the average depth value of the previous frame with a first threshold.

When the difference between the average depth values is greater than the first threshold, the second change average value extracting unit 1425 may adjust the average depth value based on the second conversion lookup table, and the second function selecting unit 1426 may select a function to adjust the depth value of the input image pixel according to the adjusted average depth value.

The second depth value adjusting unit 1427 may adjust the depth value of the input image based on the temporal depth information by adjusting the depth value of the input image pixel based on the selected function.

Figure 15:
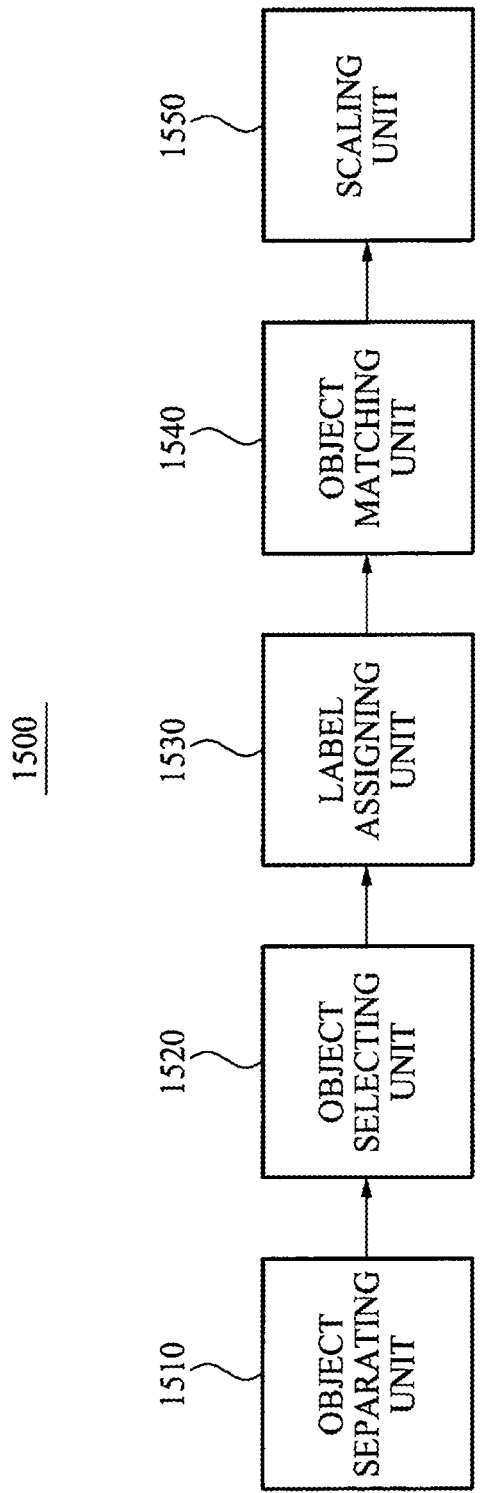
FIG. 15 is a block diagram illustrating a depth adjusting apparatus according to other example embodiments.

FIG. 15 illustrates a depth adjusting apparatus according to other example embodiments.

Referring to FIG. 15, a depth adjusting apparatus 1500 may include, for example, an object separating unit 1510, an object selecting unit 1520, a label assigning unit 1530, an object matching unit 1540, and a scaling unit 1550.

Here, the object separating unit 1510 may separate objects and a background in a depth image, and the object selecting unit 1520 may select an object satisfying a predetermined condition from among separated objects.

The label assigning unit 1530 may assign a label for the selected object, and the object matching unit 1540 may match the object to which the label has been assigned with an object of a previous frame.

The scaling unit 1550 may calculate a difference in depth between the matched objects and may perform scaling of a depth value of the object for which the label has been assigned based on the difference in depth.

Descriptions omitted in FIGS. 14 to 15 may be further understood based on the descriptions provided with reference to FIGS. 1 to 13.

A depth is adjusted adaptively in an input image by adjusting a depth value of the input image using a spatial feature and a visual feature of a 3D image, thereby reducing visual fatigue.

Also, a depth scaling is selectively performed with respect to an object having a great variation in an average depth value, thereby reducing visual fatigue without deteriorating a stereoscopic effect, The method for depth adjusting according to the above-described example embodiments may also be implemented through computer readable code/instructions in/on a medium, e.g., a computer readable medium, to control at least one processing element to implement any above described embodiment. The medium can correspond to medium/media permitting the storing or transmission of the computer readable code. The instructions may be executed on any processor, general purpose computer, or special purpose computer such as a depth adjusting apparatus.

The computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media. The media may also be a distributed network, so that the computer readable code is stored or transferred and executed in a distributed fashion. Still further, as only an example, the processing element could include a processor or a computer processor, and processing elements may be distributed or included in a single device.

In addition to the above described embodiments, example embodiments can also be implemented as hardware, e.g., at least one hardware-based processing unit including at least one processor capable of implementing any of the above described embodiments.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A method of adjusting a depth in an input image, the method comprising:
   extracting a depth value of one or more objects from the input image;
   determining spatial depth information of the input image by calculating an average depth value of the one or more objects, wherein the average depth value comprises a single average depth value representing a single object for each of the one or more objects; and
   adjusting a depth map of the input image based on the spatial depth information.

2. The method of claim 1, wherein in the adjusting of the depth map using the determined spatial depth information, when the calculated average depth value of the one or more objects is greater than a threshold value, the depth map is adjusted.

3. The method of claim 1, wherein the adjusting the depth map of the input image comprises:
   adjusting the average depth value of the one or more objects based on a first conversion lookup table;
   selecting a function to adjust a depth value of an input image pixel according to the adjusted average depth value; and
   adjusting the depth value of the input image pixel based on the selected function.

4. The method of claim 1, wherein:
   the extracting of the depth value of one or more objects comprises:
   extracting one or more objects in a current frame; and
   determining the spatial depth information by calculating an average depth value of the one or more objects in the current frame,
   and wherein the adjusting of the depth map comprises:
   extracting a first change average value, the first change average value being obtained by adjusting the average depth value of the one or more objects in the current frame based on a first conversion lookup table;
   selecting a first function to adjust a depth value of an input image pixel according to the first change average value;
   adjusting the depth value of the input image pixel based on the first function;
   comparing the difference between the average depth values with a first threshold value;
   extracting a second change average value, the second change average value being obtained by adjusting the average depth value of the one or more objects in the current frame based on a second conversion lookup table, when the difference between the average depth values is greater than the first threshold value;
   selecting a second function to adjust the depth value of the input image pixel based on the second change average value; and
   adjusting the depth value of the input image pixel based on the second function.

5. The method of claim 1, wherein the adjusting of the depth map comprises:
   receiving an output mode input from a user; and
   adjusting a depth value of a pixel of the input image in response to the input from the user.

6. The method of claim 1, further comprising:
   outputting the adjusted depth map of the input image.

7. A non-transitory computer-readable storage medium encoded with computer readable code comprising a program for implementing the method of claim 1.

8. A method of adjusting a depth in an input image, the method comprising:
   extracting depth value of one or more objects from the input image;
   determining temporal depth information of the input image by calculating a difference between a first average depth value and a second average depth value, the first average depth value being an average depth value of the one or more objects in a current frame, the second average depth value being an average depth value of the one or more objects in a previous frame, wherein the first average depth value comprises a single average depth value representing a single object for each of the one or more objects and the second average depth value comprises a single average depth value representing a single object for each of the one or more objects; and
   adjusting a depth map of the input image based on the temporal depth information.

9. The method of claim 8, wherein in the adjusting of the depth map using the determined temporal depth information, when the difference between the first and second average depth values is greater than a threshold value, the depth map is adjusted.

10. The method of claim 8, wherein the determining the temporal depth information comprises:
    extracting one or more objects in a current frame;
    calculating the first and second average depth values; and
    determining the temporal depth information of the input image by calculating the difference between the first and second average depth values.

11. The method of claim 10, wherein the adjusting of the depth map comprises:
    comparing the difference between the first and second average depth values with a threshold value;
    adjusting the first average depth based on a conversion lookup table, when the difference between the first and second average depth values is greater than the threshold value;
    selecting a function to adjust a depth value of an input image pixel based on the adjusted first average depth value; and
    adjusting the depth value of the input image pixel based on the selected function.

12. The method of claim 8, wherein the adjusting the depth map of the input image comprises:
    receiving an output mode input from a user; and
    adjusting a depth value of a pixel of the input image in response to the input from the user.

13. The method of claim 8, further comprising:
    outputting the adjusted depth map of the input image.

14. A non-transitory computer-readable storage medium encoded with computer readable code comprising a program for implementing the method of claim 8.

15. An apparatus adjusting a depth in an input image, the apparatus comprising:
    memory storing computer-readable instructions; and
    a processor configured to execute the computer-readable instructions such that the processor is configured to,
    extract a depth value of one or more objects from the input image;
    determine spatial depth information of the input image by calculating an average depth value of the one or more objects, wherein the average depth value comprises a single average depth value representing a single object for each of the one or more objects; and
    adjust a depth map of the input image based on the spatial depth information to reduce a visual fatigue of a user.

16. An apparatus adjusting a depth in an input image, the apparatus comprising:
    memory storing computer-readable instructions; and
    a processor configured to execute the computer-readable instructions such that the processor is configured to,
        extract a depth value of one or more objects from the input image;
        determine temporal depth information of the input image by calculating a difference between an average depth value of the objects in a current frame and an average depth value of the one or more objects in a previous frame, wherein the average depth value comprises a single average depth value representing a single object for each of the one or more objects; and
        adjust a depth map of the input image based on the temporal depth information to reduce a visual fatigue of a user.

* * * * *